(12) United States Patent
Cooper

(10) Patent No.: US 6,892,839 B2
(45) Date of Patent: May 17, 2005

(54) MULTI-COMBINATION VEHICLE INCORPORATING A POWER TRAILER

(76) Inventor: James W. Cooper, P.O. Box 39463, Winnellie, NT (AU), 0821

( * ) Notice: Subject to any disclaimer, the term of this patent is extended or adjusted under 35 U.S.C. 154(b) by 0 days.

(21) Appl. No.: 09/951,103

(22) Filed: Sep. 13, 2001

(65) Prior Publication Data

US 2002/0056579 A1 May 16, 2002

Related U.S. Application Data

(63) Continuation-in-part of application No. 09/418,080, filed on Oct. 14, 1999, now abandoned.

(30) Foreign Application Priority Data

Oct. 14, 1998 (AU) .............................................. PP6487

(51) Int. Cl.⁷ .............................................. B60D 53/00
(52) U.S. Cl. ..................... 180/14.2; 180/14.6; 180/68.4
(58) Field of Search ................................. 280/408, 420, 280/422, 476.1; 180/68.4, 14.1, 14.2, 14.3, 14.6

(56) References Cited

U.S. PATENT DOCUMENTS

| | | | | |
|---|---|---|---|---|
| 2,140,109 A | * | 12/1938 | Kellar ........................ | 180/14.2 |
| 2,235,175 A | * | 3/1941 | Simpkins et al. .......... | 180/14.2 |
| 2,406,944 A | * | 9/1946 | Choate et al. ............. | 180/14.2 |
| 2,630,871 A | * | 3/1953 | Simpkins .................... | 180/14.2 |
| 3,027,962 A | * | 4/1962 | Wolf .......................... | 180/14.2 |
| 3,578,096 A | | 5/1971 | Pearson ........................ | 180/14 |
| 3,695,373 A | * | 10/1972 | Bostrom ..................... | 180/14.3 |
| 3,865,205 A | * | 2/1975 | Swanson ..................... | 180/218 |
| 3,966,255 A | * | 6/1976 | Licari ........................ | 198/35 M |
| 4,119,166 A | | 10/1978 | Ayotte et al. ............. | 180/14 R |
| 4,403,647 A | * | 9/1983 | Melley, Jr. ................... | 165/41 |
| 4,460,055 A | * | 7/1984 | Steiner ........................ | 180/7.1 |
| 4,505,347 A | | 3/1985 | Prechtel ..................... | 180/41.2 |
| 4,600,210 A | * | 7/1986 | McMurray ................... | 280/408 |
| 5,201,379 A | * | 4/1993 | Penzotti et al. ........... | 180/89.18 |
| 5,447,132 A | * | 9/1995 | Shoda et al. ................ | 123/357 |

FOREIGN PATENT DOCUMENTS

| | | |
|---|---|---|
| AU | A-77124/91 | 11/1991 |
| DE | 3206403 A1 | 9/1982 |
| DE | 4324211 A1 | 1/1995 |
| WO | WO 86/02048 | 4/1986 |
| WO | WO 86/04310 | 7/1986 |

* cited by examiner

Primary Examiner—Daniel G. DePumpo
(74) Attorney, Agent, or Firm—Francis Law Group

(57) ABSTRACT

The present invention is for a multi-combination vehicle or road-train consisting of a powered prime mover, at least one powered trailer and which may include a number of non-powered trailers. The power trailer includes a cooling device separated from the engine to provide improved cooling and enabling the road-train to be used in confined areas such as in underground mines. Typically the cooling device located at the front or rear of the power trailer. The engines of the prime mover and power trailer(s) are controlled either by a synchronisation-system and a dual-pot accelerator pedal by controlling their relative torques or by manual controls in the truck cab.

17 Claims, 12 Drawing Sheets

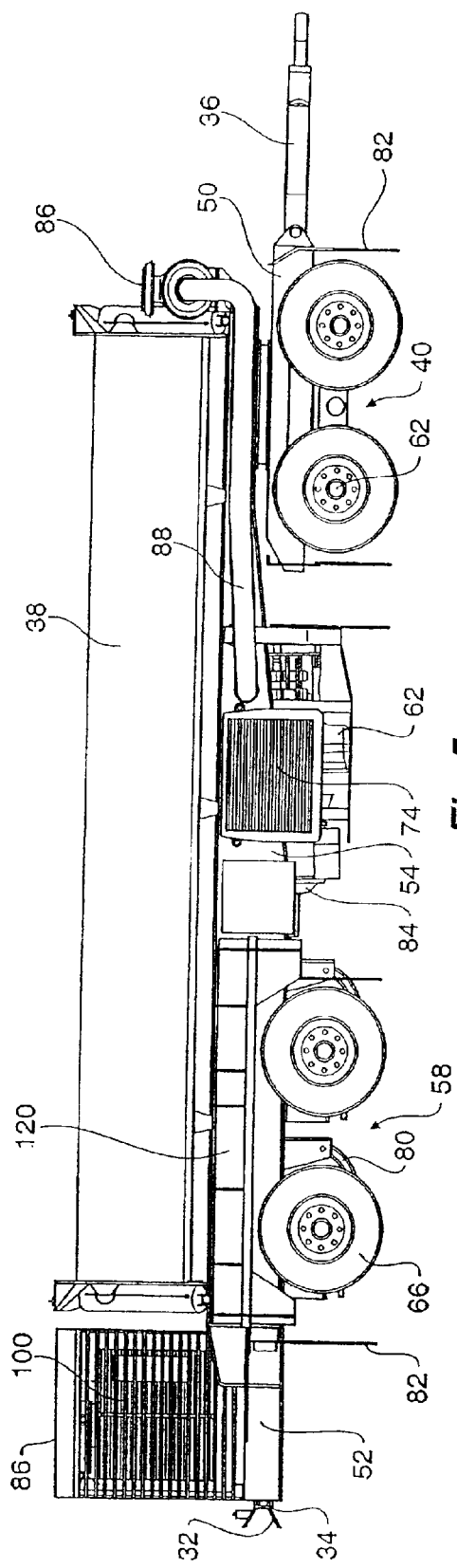
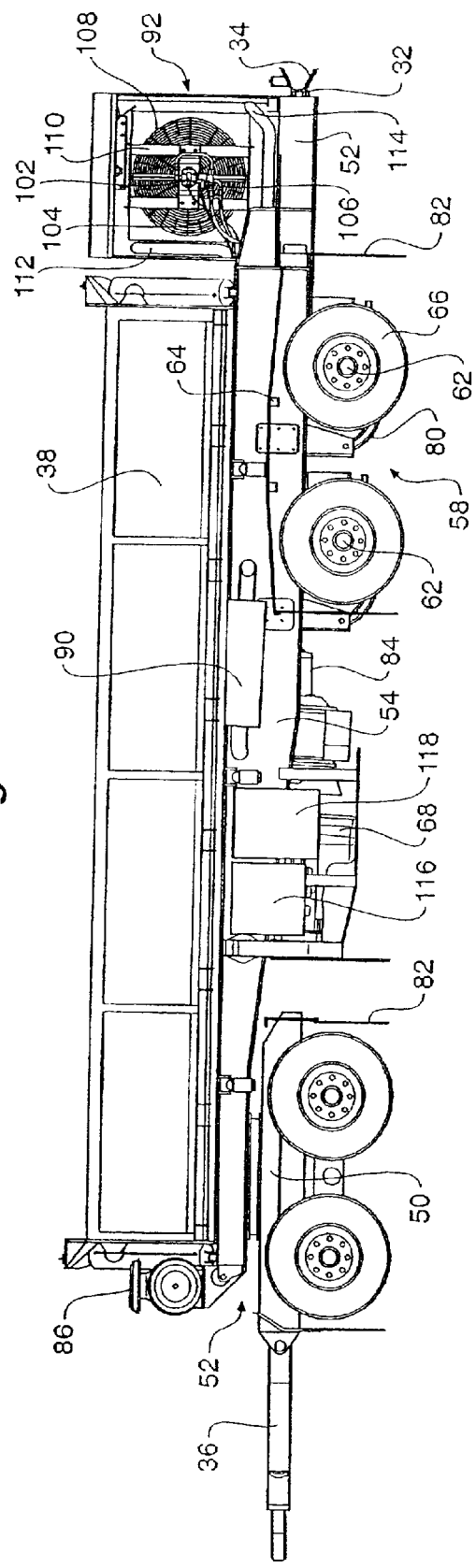
Fig 5
Fig 6

MULTI-COMBINATION VEHICLE INCORPORATING A POWER TRAILER

RELATED APPLICATIONS

This application is a CIP of U.S. patent application 09/418,080 that was filed Oct. 14, 1999 and is now abandoned.

FIELD OF THE INVENTION

The present invention is directed to multi-combination vehicles that carry payloads and where the power-to weight ratio of the vehicles needs to be maintained at an acceptable level through the use of additional power sources or engines mounted on a power trailer and operatively coupled to the primary engine found in such vehicles.

BACKGROUND OF THE INVENTION

Mined payloads, such as various metal ores, are typically transported aboveground or through the tunnels of an underground mine by either a railway train including a locomotive and one or more cars operating on a fixed system of railway tracks, or rigid body, load-carrying trucks. Although each known system may be advantageously utilized in certain applications, they are both subject to various disadvantages.

A railway system, especially one underground, is relatively expensive to install and operate due to the cost of acquiring the locomotive and installing the fixed railway system and the associated maintenance costs, Furthermore, and perhaps more importantly, an underground railway system is route-specific and therefore not flexible to changes in route without incurring the expense of installing additional railway tracks. Underground mines typically have several mining areas, which may occur on multiple levels within the mine. The mined product, such as ore, is typically transported from each mining area to a common receiving area, and then through one or more vertical chutes connecting different levels of the mine if required, to a central processing area where the ore is processed, or sufficiently crushed. The ore is then typically removed from the mine through a single vertical shaft extending to the surface. A single ore crusher and associated shaft are typically used due to the prohibitive costs associated with drilling a shaft from the surface to the mining area deep below the ground. As each new mining area opens, it is necessary to incur the cost of installing new track for the railway system, or to use supplemental vehicles to haul the ore from the mining area to the end of the railway track system.

Rigid body load-carrying trucks, such as wheeled dump trucks, are not route-specific since they are capable of traveling over various roadways within the mine between various origination and destination points. However, known trucks of this type are typically designed for hauling loads over relatively short distances and rough terrain, such as that which may be experienced in aboveground applications. Accordingly, such trucks are typically designed with relatively large tires for relatively slow speed operation and are relatively expensive to operate and maintain due to fuel and tire costs. The efficiency of these vehicles typically decreases as the hauling distance increases. In addition, a single rigid body truck of this type has a significantly lower payload capacity as compared to the multicombination vehicle of the present invention. They are therefore not suitable for hauling ore great distances away from the mine and limit the distance that ore can be transported to a local processing plant at reasonable cost.

Another difficulty with these types of dump trucks is that the roads constructed in underground mines are typically blacktop roads that are not designed to carry excessive loads. Wheeled dump trucks with large tires carry a significant loading per axle, up to 33 tons per axle, and are prone to tear up blacktop roads thereby precluding their use. In lieu of blacktop roads, clay and gravel roads are used that must be graded and treated with water for safety purposes, to keep down dust from the road. Other problems with articulated dump trucks are that they have poor power-to-weight ratios and with their low engine efficiency they exhaust a significant amount of hot air into the mine per ton of ore hauled. Cold ventilation air has to be continually pumped into the mine via ventilation shafts, and one of the major costs in establishing underground mines is the construction and drilling of ventilation shafts. The excess heat produced by dump trucks means that the time that they can operate underground is limited. Since the dump trucks move relatively slowly, and the inclination within underground mines is usually constant, the depth of mine accessible by these dump trucks is limited, typically to a depth of up to six hundred meters.

Multi-combination vehicles, such as over-the-road vehicles, are known and include a prime mover coupled to a plurality of trailers and converter dollies. Typically these vehicles have a single power source, generally a diesel engine, and are limited in gross combination mass to 200–230 tons. These multicombination vehicles, commonly referred to as "road trains", have been in use for some time, particularly in Australia, for the purpose of hauling mined products or commodities of other industries, over aboveground roadways. Conventional "road trains" are typically designed for use at relatively high speed and on relatively flat ground, and are therefore not capable of hauling loads out of underground mines for the following reasons.

Due to the heavy loads of the road-train combination, the traction provided by the wheels of a road-train, usually provided to two rear axles, is insufficient for any realistic gradient found in underground mine roads. Alternatively the roads from underground mines would have to be constructed at a much gentler slope leading to excessively long tunnels. In addition, the relatively low speed of the road trains underground due to the size of the tunnels and safety considerations results in road-trains traveling underground for a significant length of time, even up to an hour in some cases. This places strain on the road-train cooling system, which is typically designed for road-trains traveling at significant speeds, generally more than 80 km/h and the engines generally overheat.

There have been several proposals in relation to vehicles where there is an increase in its traction, including hydraulically driven axles and mechanically linked axles whilst using a single power source. Other proposals have included the use of a separate engine placed on the dolly or trailer that assists in pulling the load. Although vehicles having a trailer with an additional engine are known, these have been found to be useful only for providing short term bursts of power to the road-train as a whole and are not suitable for long-term hauling especially out of underground mines for the following reasons. Firstly the additional engines are mounted on top of the trailer or dolly, reducing the usable volume of the road-train for ore or load carrying. Secondly, these additional engines are not accommodated within the existing chassis structure of current road-trains and are therefore not road-legal. Furthermore, and perhaps most importantly, these additional engines once again have standard cooling mechanisms that have been found to be insufficient when the road train has been traveling up a gradient for a relatively long time at a relatively slow speed. Even if a road train having a single power source was used on flat roads within the underground mine, the slow speed that the vehicle is limited to travel results in the road-train's engine overheating.

Multi-combination vehicles for dedicated road haulage tasks such as mineral concentrate haulage are currently operating at a Gross Combination Mass (GCM) of up to 230 tons. However, there is a practical limit to the GCM of the multi-combination vehicle with a single prime mover. The cost of haulage is determined mainly on weight. If one can therefore increase the total haulage that can be moved by a single prime mover that does not require additional operators, the cost benefit is substantial especially if ore can be hauled directly from within a mine without needing to be reloaded onto another transport system.

The inventor is unaware of any known aboveground or underground, roadlegal multicombination vehicle of the type just described, which is capable of gaining access to an underground mine and operating within the profiles of the mine as typically exists in underground mines throughout the world. The inventor is further unaware of any aboveground road-legal multicombination vehicle that is capable of operating normally without unnecessarily loading the primary engine of such vehicles.

In view of the foregoing disadvantages and limitations associated with known load-carrying vehicles, a commercial need exists for an improved load-carrying vehicle for use both aboveground and in underground mines that overcomes at least some of the abovementioned problems or provides the public with a useful alternative.

Accordingly, the present invention discloses an additional motive power source for use with a prime mover, advantageously located within the chassis of a trailer and including a unique cooling mechanism that enables operation of the road-train at low speeds and steeper gradients than hitherto known.

SUMMARY OF THE INVENTION

Therefore in one aspect of the invention there is proposed a multicombination vehicle for use in transporting a product over roadways, said vehicle including:

a powered towing unit having a chassis, a forward, wheeled steering axle suspended from said chassis and a rear axle assembly having at least one wheeled axle and suspended from said chassis by a rear suspension system, said wheeled axles supporting the powered unit for movement over the roadways, wherein at least one of said wheeled axles comprises a driving axle, said powered towing unit further including a source of motive power mounted on said chassis and means for transmitting torque from said source of motive power to said at least one driving axle;

a power trailer mechanically coupled to said powered towing unit and including a chassis, a load-carrying body mounted on and disposed above said chassis, and at least one wheeled, driven axle supporting the power trailer for movement over the roadways, said at least one wheeled, driven axle being suspended from said chassis of said power trailer, said power trailer including a source of motive power mounted on said chassis and means for transmitting torque from said source of motive power to said at least one driving axle;

said powered trailer further including a cooling means mounted on said chassis and in fluid communication with said motive power source;

said powered towing unit further including an engine control means located in a cab of said unit;

said power trailer further including an engine control means located in said powered towing unit cab.

Preferably the cooling means is located at the front of said power trailer.

Preferably the cooling means is located at the rear of said power trailer.

Preferably the cooling means is located at the side of said power trailer.

Preferably the torques of the powered unit control means and the power trailer engine control means are synchronized so that when the torque of the powered unit engine is increased so is proportionally the torque of the power trailer engine.

Preferably a dual-potentiometer accelerator pedal is the control means of both the powered towing unit and the power trailer.

Preferably the power trailer includes a load-carrying body mounted and disposed above said chassis.

Preferably the powered towing unit is a rigid body truck and said source of motive power is an internal combustion engine and said means for transferring torque includes a transmission.

Preferably the power trailer source of motive power is an internal combustion engine and said means for transferring torque includes a transmission.

Preferably the power trailer control means is a manual hand throttle located in the powered towing unit.

Preferably a first trailer is located between the powered towing unit and the power trailer, said powered trailer being mechanically coupled to said first trailer.

In a further form of the invention there is proposed a multi-combination vehicle including:

a prime mover including a first engine located on said prime mover;

a trailer mechanically coupled to said prime mover and including a second engine located on said trailer;

a control means adapted to operatively couple the first and second engine sources;

said trailer further including a cooling means separated from said second engine.

Preferably the control means is a calibrated dual-potentiometer accelerator pedal controlling the torque output of each engine.

DESCRIPTION OF THE DRAWINGS

The accompanying drawings, which are incorporated in and constitute a part of this specification, illustrate several implementations of the invention and, together with the description, serve to explain the advantages and principles of the invention. In the drawings.

FIG. 5 is a right hand side view of a power trailer of FIGS. 3 and 4;

FIG. 6 is a left hand side view of a power trailer of FIGS. 3 and 4;

DESCRIPTION OF THE PREFERRED EMBODIMENT

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

Figure 1:
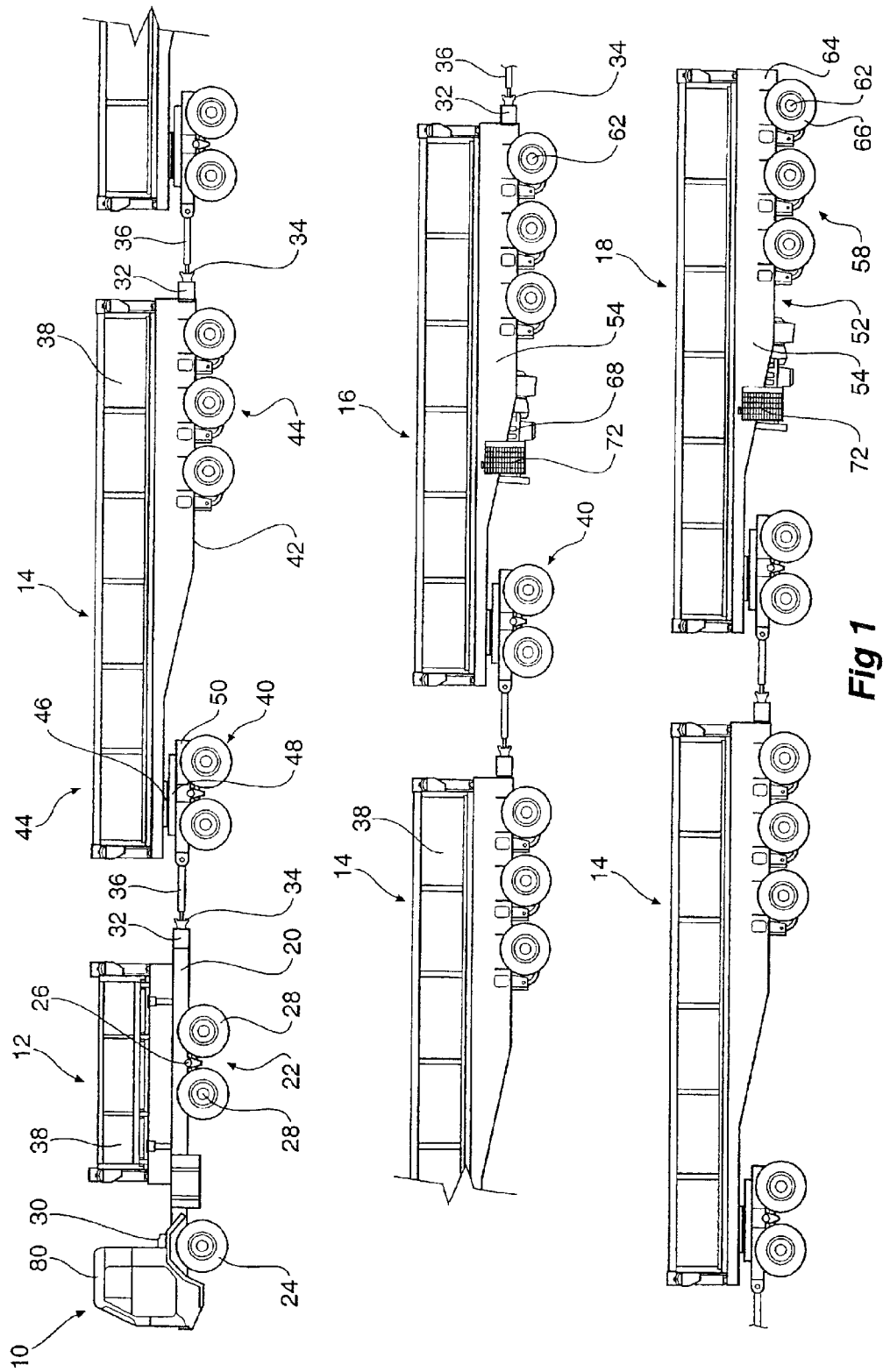
FIG. 1 is a side elevation drawing of a multi-combination vehicle incorporating a power trailer according to one embodiment of the present invention.

Turning now to the drawings in detail there is shown in FIG. 1 a multi-combination vehicle 10 including a prime mover 12 mechanically coupled to a plurality of trailers 14. A power trailer 16 extends from forwardly located trailers 14 and a further trailer 14 is coupled to the power trailer 16. A second power trailer 18 is coupled to the last trailer 14. It is however to be understood that the multi-vehicle combination may include one or more power trailers, depending on the application.

The prime mover 12 includes a chassis or frame 20 and a rear axle assembly 22, which is suspended from and disposed below the chassis 18. Forward axle 24 comprises the steering axle of the prime mover 12. The rear axle assembly 22 is suspended from chassis 18 via an air suspension 26 and includes wheeled axles 28. Both of the wheeled axles may be driving axles, or alternatively only one is a driven axle. The driving axles may be a tridem axle assembly in lieu of the tandem axle assembly 22 and possibly suspended with a mechanical suspension.

The prime mover 12 further includes a motive power source 30 and a transmission (not shown) for transmitting torque from the motive power source 30 to the drive axles 28. Typically the source of motive power comprises a diesel engine (usually turbocharged or supercharged) and the transmission for transmitting torque from the engine 30 to the drive axles 28 includes a gearbox, a drive shaft and a differential (not shown). Alternatively, the source of the motive power 30 may comprise other types of internal combustion engines utilizing a variety of fuels. As yet another alternative the source of motive power 30 may comprise an electric motor with the transmission transmitting torque comprising a suitable coupling interconnecting the electric motor and axle assembly.

The prime mover further includes a draw frame 32 attached and rearwardly extending from the chassis 20. A coupling 34 is attached to the rear of the draw frame and connected with a drawbar 36 on the trailer. A bin 38 accommodates the payload to be carried by the prime mover and may be adapted to be side-tipping by hinged attachment to the frame 20 (not shown).

Each of the trailers 14 includes a converter dolly 40 and a semi-trailer 42, having a rear axle assembly 44, a forward end with a coupling system 46 that pivotably attaches to a ball-race turntable 48 on the converter dolly. This enables the converter dolly to pivot relative to the semi-trailer about a generally vertical axis of rotation passing through the centre of the ball-race turntable. Other embodiments may however equally well be used, such as an oscillating ball-race turntable. The drawbar 36 is hingedly connected to the chassis 50 of the converter dolly 40 and accommodates for any change in the grade of the road surface. As with the prime mover, the trailer further includes a draw frame 32 attached and rearwardly extending from the chassis 42. A coupling 34 is attached to the rear of the draw frame 32 and is connected with a drawbar 36 on the next trailer or power trailer. A bin 38 accommodates the payload to be carried by the trailer and may be adapted to be side-tipping by hinged attachment to the frame 52 (not shown).

Figure 2:
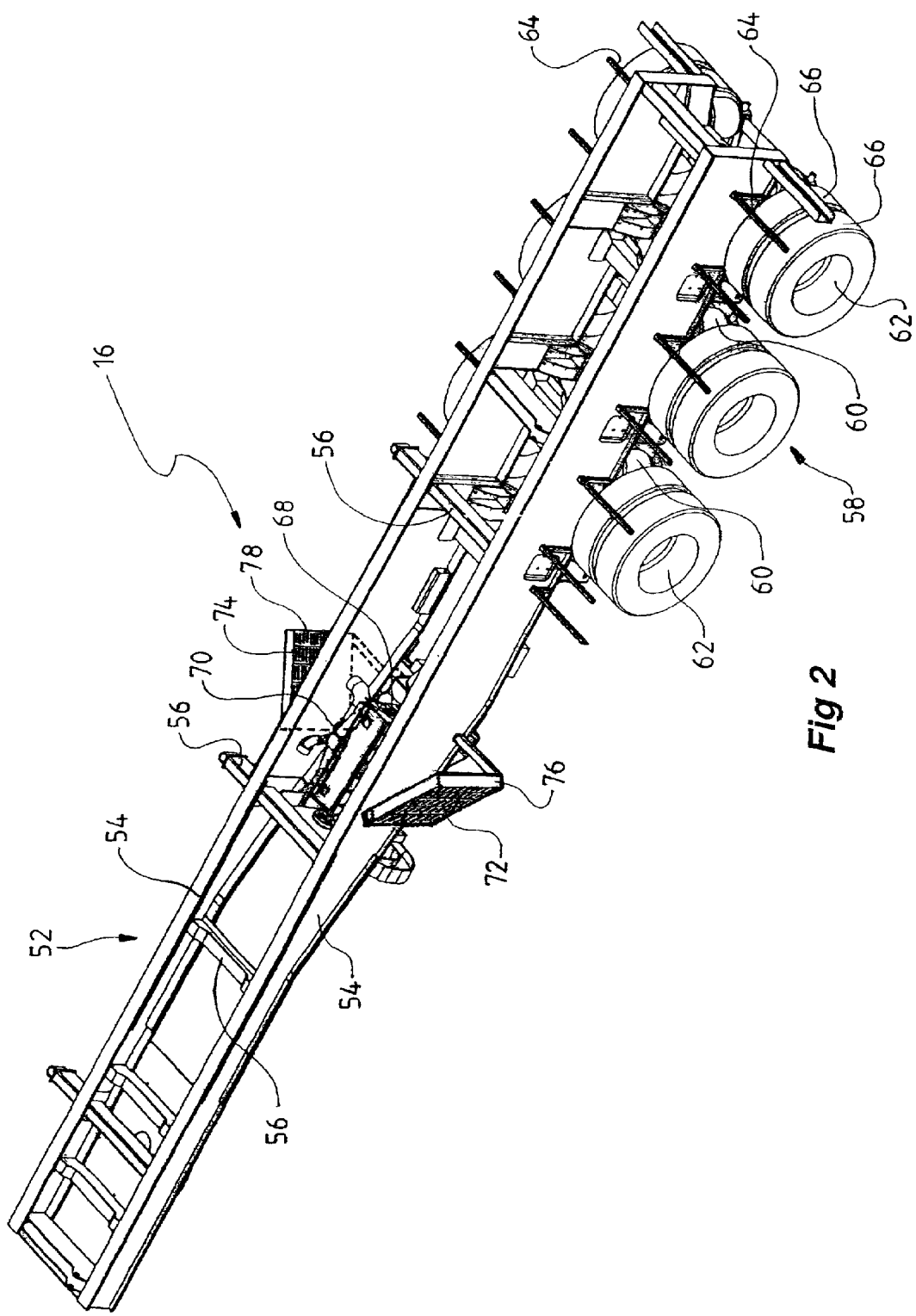
FIG. 2 is a perspective view of a power trailer according to a first embodiment.
Figure 3:
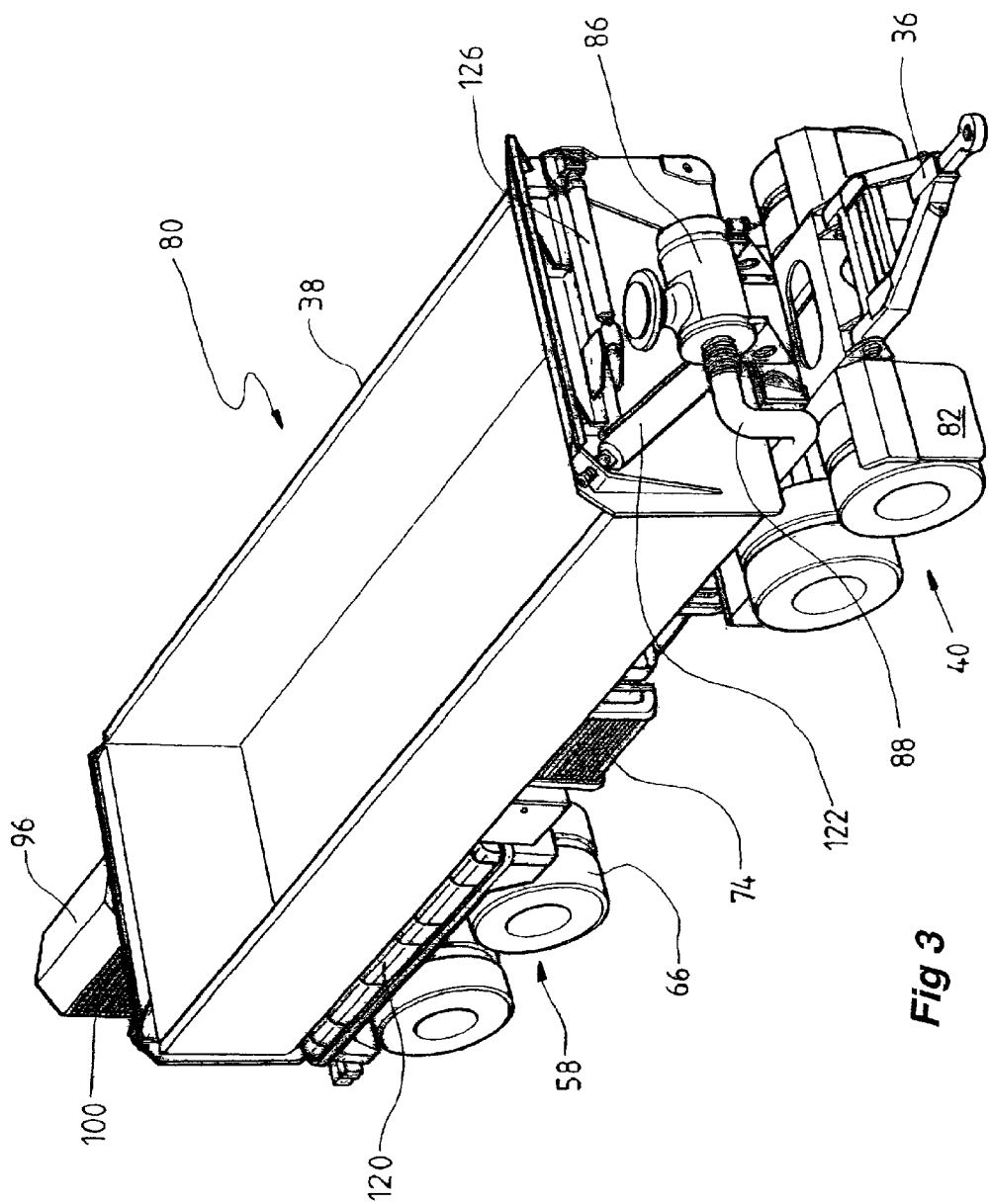
FIG. 3 is a front perspective view of a power trailer according to a second embodiment of the present invention.
Figure 4:
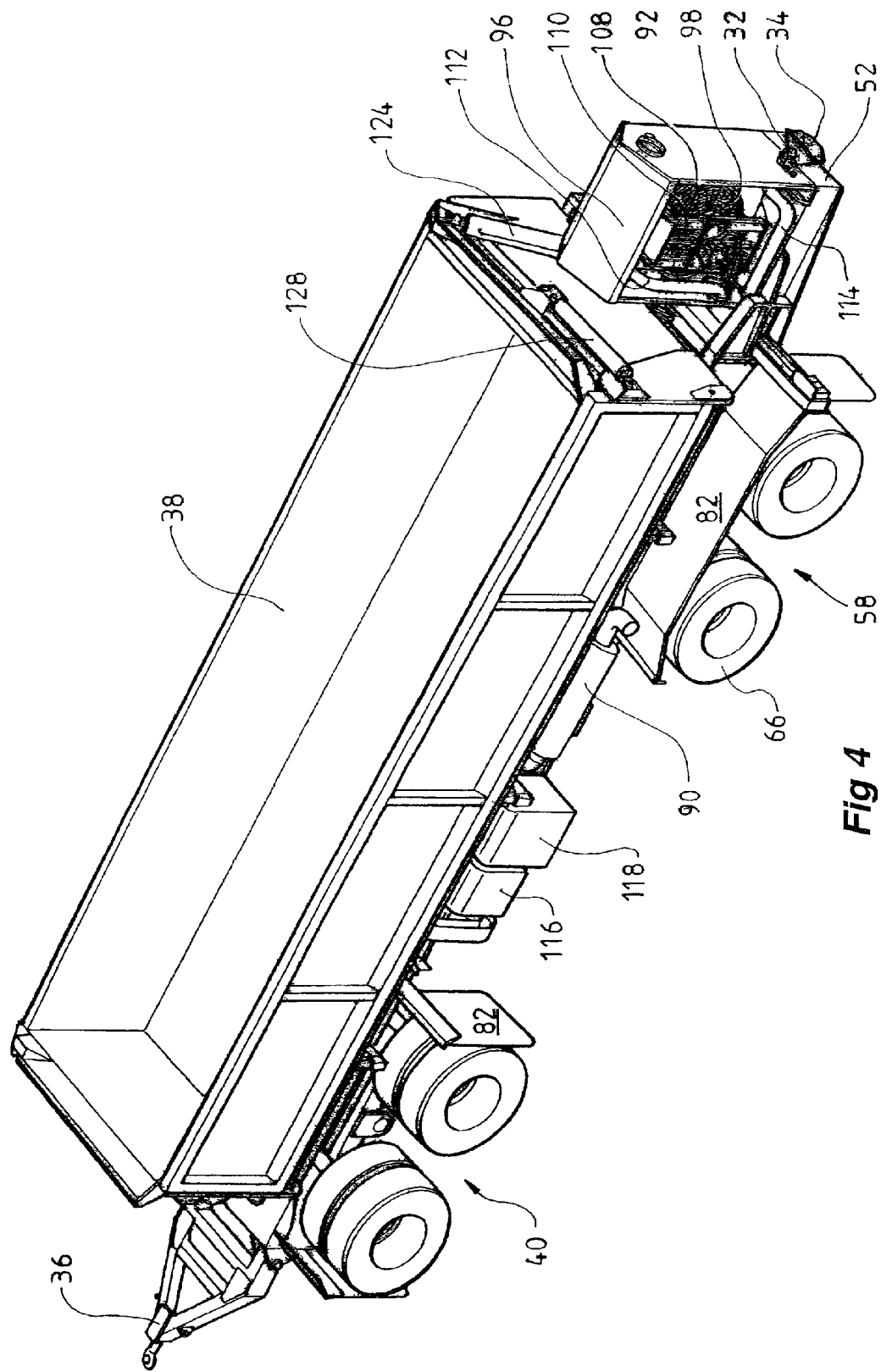
FIG. 4 is a rear perspective view of a power trailer according to a second embodiment having a cooling means located at the rear of the trailer.

Referring to FIGS. 1 and 2, the semi-trailer of the power trailer 16 includes a chassis or frame 52 which includes a pair of longitudinally extending side members or beams 54 and a plurality of transverse cross-members 56 interconnecting and attached to the side members 54. The semi-trailer includes a rear axle assembly 58 that is suspended from chassis 52 by an air suspension 60. Alternatively the semi-trailer 42 may include a conventional mechanical spring assembly. The two side members support or form part of the load carrying structure such as bin 38. The load carrying structure may be a side-tipping trailer, a stock crate, a fuel tank or any other type of structure for supporting a load. As with the prime mover and the trailer, the power trailer further includes a draw frame 32 attached and rearwardly extending from the chassis 52. A coupling 34 is attached to the rear of the draw frame 32 and connected with a drawbar 36 on the next trailer or power trailer and may be adapted to be side-tipping by hinged attachment to the frame 52 (not shown).

The rear axle wheel assembly 58 includes wheeled axles 62. Extending above said wheeled axles are bearing members 64 that may be used to support mudguards and the like (not shown). In an alternative form the axle assembly may be a tandem assembly in lieu of the tridem axle assembly. The wheeled axles include a plurality of tires 66 mounted thereon for supporting the semi-trailer as it travels over a road surface.

Mounted below the upper surface of the chassis 52 is a motive power source or engine 68 (also referred to as the secondary engine) positioned generally centrally between and extending under the side members 54 and the chassis. A transmission (not shown) provides driving power from the engine to the axle assembly 58 where one or more of the wheeled axles 62 may be driven. The engine is typically a diesel engine and may advantageously include a turbocharger 70. To be able to fit the engine between the side members, the spatial distance between the two is generally larger than that conventionally found on existing semi-trailers. However, the standard width of the wheeled axles is kept the same to keep the vehicle roadworthy. This has been achieved by mounting the suspension 60 under said side members rather than on their side.

The engine 68 includes a radiator 72 to assist in cooling the engine by cooling the engine coolant. The radiator is mounted away from the engine, in the first embodiment on the side of the engine as illustrated in FIGS. 1 and 2. This has significant advantages in relation to extracting heat from the coolant in contrast to typical radiators that are mounted at the front of the engine. The lack of sufficient cooling of the coolant has been found to be one of the most significant problems in the use of trucks and/or power trailers in areas such as underground mines. Current engine designs having radiators mounted at the front of an engine block have been found to be unsuitable for use with power trailers for several reasons.

Firstly, once air has passed through the radiator, it flows over the engine itself and thereby provides additional cooling. However, if the coolant operates at high temperatures, than the air flowing over the engine itself will already be quite warm and even hot, and will provide limited additional cooling for the engine and may even keep it hot. This is an undesirable result especially where the airflow is quite low, such as when operating at slow speeds in an underground mine. Secondly, and perhaps more importantly, the radiator and its assembly needs to be of a minimum size to provide sufficient surface are for cooling for the coolant, especially when the road-train is moving at relatively slow speeds up an incline for a significant period of time working the engine quite hard. The constrained space underneath a trailer chassis is simply not large enough for mounting a radiator having a sufficiently large surface area.

These disadvantages have been overcome by positioning the radiator away from the engine. In the first instance this is achieved by placing the radiator at an angle on the side of the engine in a first embodiment of the invention. The airflow through the radiator then does not flow over the engine. Secondly, positioning the radiator on the side of the engine in a power trailer exposes the radiator to undisturbed air. In addition, by angling the radiator, the total size of the radiator can be sufficiently large to provide for the needed cooling even when the road train is moving at relatively slow speeds.

The power trailer further includes a turbocharger air cooler 74 that cools the air injected into the engine. That is mounted on the opposite side of the general radiator 72 and is thus also exposed to undisturbed airflow.

The person skilled in the art will appreciate that in a conventional cooling system, where the radiator and air cooler are mounted at the front of the vehicle, the radiator has insufficient capacity to sufficiently cool the coolant of the engine. Furthermore, the airflow through the radiator then flows onto the engine effectively heating it, which is also undesirable. Use of a conventional engine design in a power trailer is therefore not suitable.

The present invention teaches that to achieve a sufficient flow through of air through the radiator 72 and the turbocharger air cooler 74 on the power trailer 14, the radiator 72 and the air cooler 74 are positioned externally of said side members 54, with the outer edge of the radiator 76 and the outer edge of the turbocharger air cooler 78 not extending beyond the outer extent or foot-print of the power trailer. This ensures that the radiator 72 and turbocharger air cooler 74 are protected.

Depending on the capacity of the engine, a minimum square area of the radiator and turbocharger air cooler is required. Typically, each horsepower of an engine requires around 10 square centimeters of radiator and turbocharger air cooler area. To achieve this in the space provided both the radiator and the turbocharger air cooler are positioned at an appropriate angle to the longitudinal axis of the side members 54, the angle depending on the size of the radiator and turbocharger air cooler required for the size of the engine. To further assist in providing an airflow through the radiator and/or turbocharger air cooler an air fan (not shown) may be provided. Typically air fans are hydraulically driven.

Illustrated in FIGS. 3–6 is a power trailer according to an alternative and perhaps preferred embodiment of the present invention. A power trailer 80 includes a chassis or frame 52 including a pair of longitudinally extending side members or beams 54 and a plurality of transverse cross-members (as illustrated in FIG. 2) interconnecting and attached to the side members 54. The power trailer includes a rear axle assembly 58 that is suspended from chassis 52 by a suspension 80. The side members support load-carrying bin 38. The bin 38 in this embodiment is illustrated as a side-tipping trailer. It is however to be understood that it is not intended to limit the invention to any particular type of load carrying structure. As with the prime mover and an ordinary trailer, the power trailer further includes a draw frame 32 attached and rearwardly extending from the chassis 52. A coupling 34 is attached to the rear of the draw frame 32 and connected with a drawbar 36 on the next trailer or power trailer and may be adapted to be side-tipping by hinged attachment to the frame 52 (not shown).

The rear axle wheel assembly 58 includes wheeled axles 62. Extending above said wheeled axles are bearing members 64 that may be used to support mudguards 82. The wheeled axles include a plurality of tires 66 mounted thereon for supporting the power trailer as it travels over a road surface.

Mounted below the upper surface of the chassis 52 is an engine 68 ("secondary engine") positioned generally centrally between the side members 54 and the chassis. A transmission 84 provides driving power from the engine to the axle assembly 58 where one or more of the wheeled axles 62 may be driven. The engine is typically a diesel engine and includes a air-cooling unit 74.

The engine 68 is supplied with combusting air through an air inlet 86 that is located at the front of the power trailer and that includes appropriate filters to filter the air. The filtered air is then fed through to the engine via air pipe 88. Exhaust gases are vented from the engine through exhaust outlet 90.

The engine includes a radiator 92 to assist in cooling the engine by using an appropriate cooling fluid or coolant. In this particular advantageous embodiment the engine cooling means or the radiator 92 is mounted at the rear of the power trailer on top of frame 52 that extends further rearward. Typically, the length of the frame would be extended to accommodate the radiator positioned along the frame. However, the frame may very well remain the same length as in conventional trailers, but the length of the bin 38 would be shortened to provide sufficient space to accommodate the radiator.

The radiator includes coolant coils 94 mounted in a housing 96. An air fan 98 is mounted behind the coils 94 and is driven so as to draw air through the coils. Located in front of the coils is a grill 100 to offer some protection to the coils from damage by debris. The air fan typically includes a hydraulic motor 102 driven by the supply of hydraulic fluid through conduits 104 and 106. The air fan is also housed in a protective grill 108 and is supported in position by support bars 110 extending between the top and bottom of the housing 96.

Coolant is supplied to the radiator through inlet pipe 112 and back to the engine through outlet pipe 114. The significant distance between the radiator and the engine means that the length of pipes transporting the coolant is quite long. This in itself provides an advantage in that the volume of coolant for the engine system has been greatly increased as compared to conventional engine designs where the radiator located in front of the engine. The volume of the pipes effectively acts as a large coolant store.

Located around the engine are various compartments 116 and 118 that house the necessary control and sensing equipment for the engine such as engine starting controls and diagnostic instruments. Typically these systems include communication means with the prime mover so that the driver is kept advised as to the general status of the power trailer engine.

Power trailer fuel tanks 120 are located above the right hand side of the rear axle 58 and also act as pseudo-mudguards. Side-tipping hydraulic arms 122 and 124 are provided at the front and rear of the bin respectively whilst arms 126 and 128 control opening the side of the bin.

Figure 7:
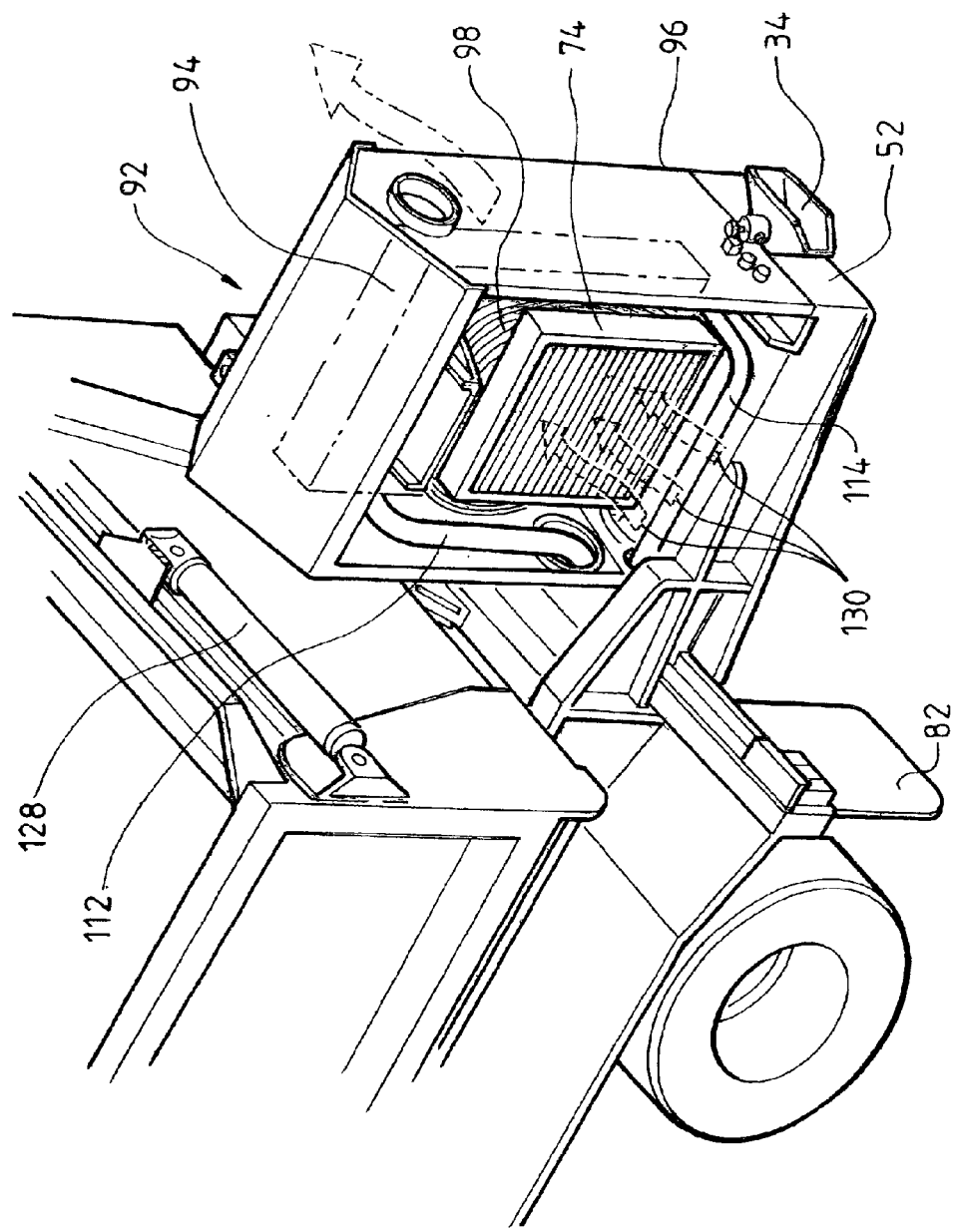
FIG. 7 is a partial perspective view of a rear of a power trailer embodying the present invention.

In some circumstances it may be advantageous to also mount the turbocharger cooling means away from the engine and at the rear of the power trailer. This is illustrated in FIG. 7 wherein the turbocharger air cooling unit 74 is placed on the opposite side of the air fan 98 and where the flow of air 130 is directed so that the air is first drawn through the turbocharger cooling means 74 by the fan 98 and then forced through the radiator coils 94.

Figure 8:
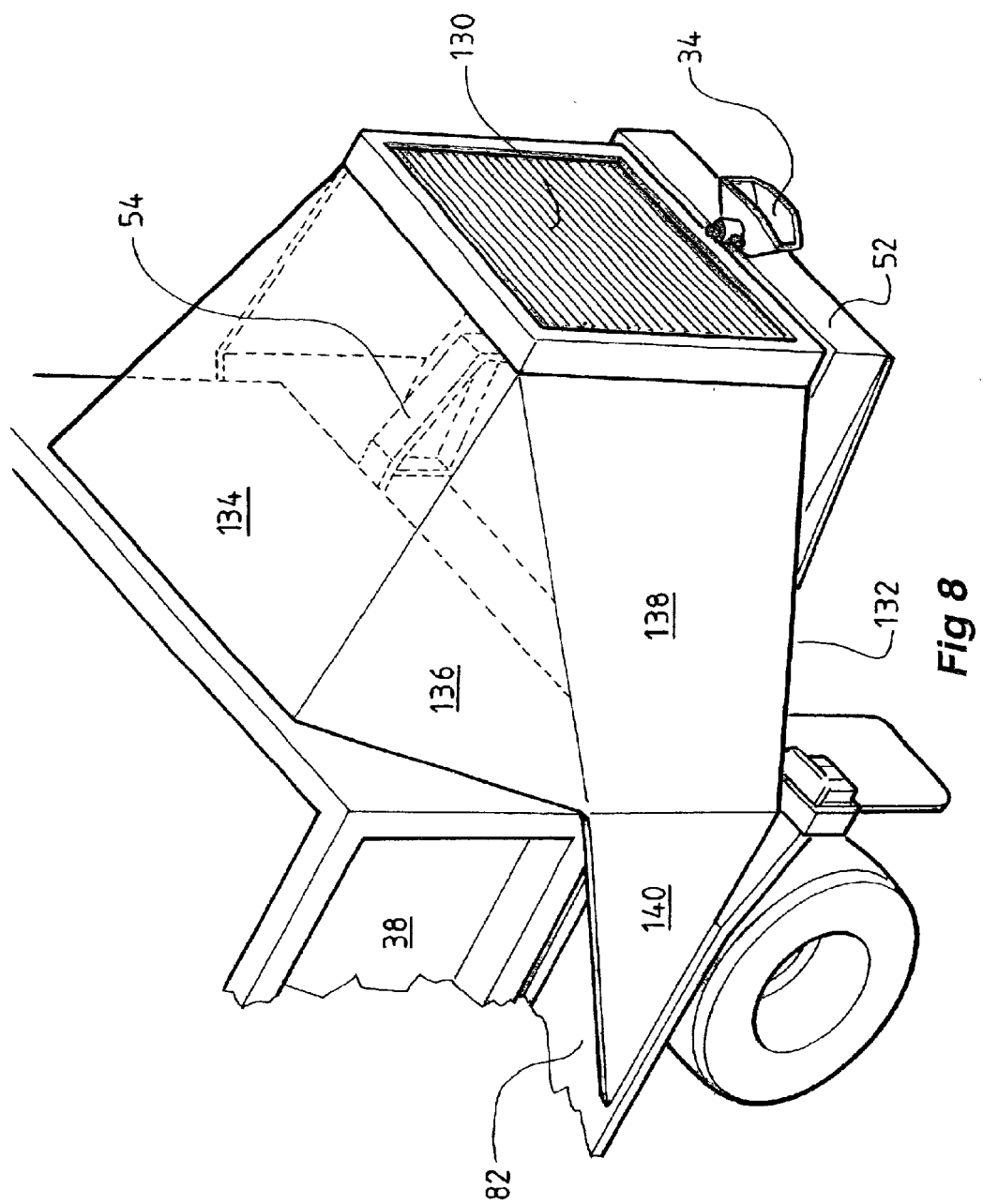
FIG. 8 is a partial perspective view of a rear of a power trailer embodying the present invention and including a protective sheath.

The power trailer according to the present invention may also be used to transport loads aboveground and over significant distances. Operating aboveground on existing roadways allows road-trains using a power trailer to travel at relatively large velocities. When moving at velocities around or greater than 50–60 km/h the airflow over the radiator coils is sufficient to provide adequate cooling without the use of air fans. However, the radiator coils have to receive an uninterrupted airflow and positioning the radiator underneath the chassis is not appropriate for the reasons already discussed. An alternative embodiment where an air fan may not be required is illustrated in FIG. 8. The radiator 130 is oriented so that it lies perpendicularly across the chassis or side members 54 of the power trailer and is positioned at the end of the frame 52, there being a physical separation between the radiator and the end of the bin 38. An air scoop 132 extends from the back of the bin to the radiator. The scoop includes a top 134, corners 136 and sides 138 configured to direct the airflow over the radiator. Sides 138 extend angularly and outwardly from the radiator terminating in ends 140 that taper downwardly to the top of mud-guard 82. Those skilled in the art can immediately appreciate that as the vehicle is traveling at-speed the power-trailer sweeps air that is then redirected over the radiator coils to provide for the cooling.

Figure 9:
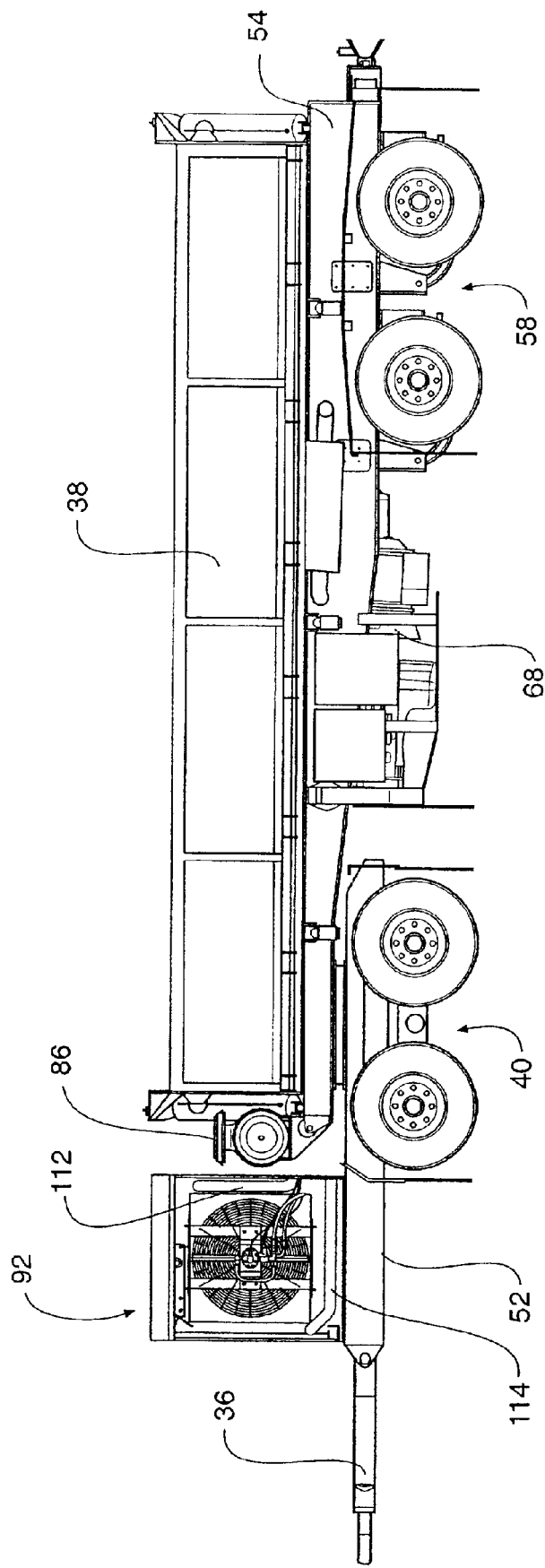
FIG. 9 is a left hand side view of a power trailer according to the present invention having the cooling means located at the front of the trailer.

At times it may be desirable to locate the radiator at the front of the power trailer, for example, if the trailer bin was to be rear tipping. Such an embodiment is illustrated in FIG. 9 wherein frame 52 is extended at the front of the trailer to accommodate radiator 92. The configuration of the radiator is the same as that illustrated in FIGS. 3–6. The orientation of the radiator is also kept the same, that is, the air fan is located on the left hand side of the radiator as one is facing in the forward direction of the power trailer. The radiator will generally face towards the middle of the road as the power trailer is being driven on common roads. Thus, in countries such as Australia where vehicles drive on the left hand side of the road, the radiator faces right so that air drawn through the radiator by the fan is from the center of the road and not from the edge of the road where dust and debris may have been stirred up by passage of the road train. Conversely, in countries such as the United States where one drives on the right hand side of the road, the radiator would typically face to the left so that clean air is drawn through the radiator.

The use of a radiator remotely mounted from the engine provides significant advantages over known prior art. As discussed above, the surface area of a radiator required depends on the total horsepower of the engine as well as how hard the engine is working. Diesel engines provide large torques and when traveling at a slow speed such as in an underground mine, an engine working at full capacity provides significant motive power to the drive wheels when geared down through the transmission system.

Figure 10:
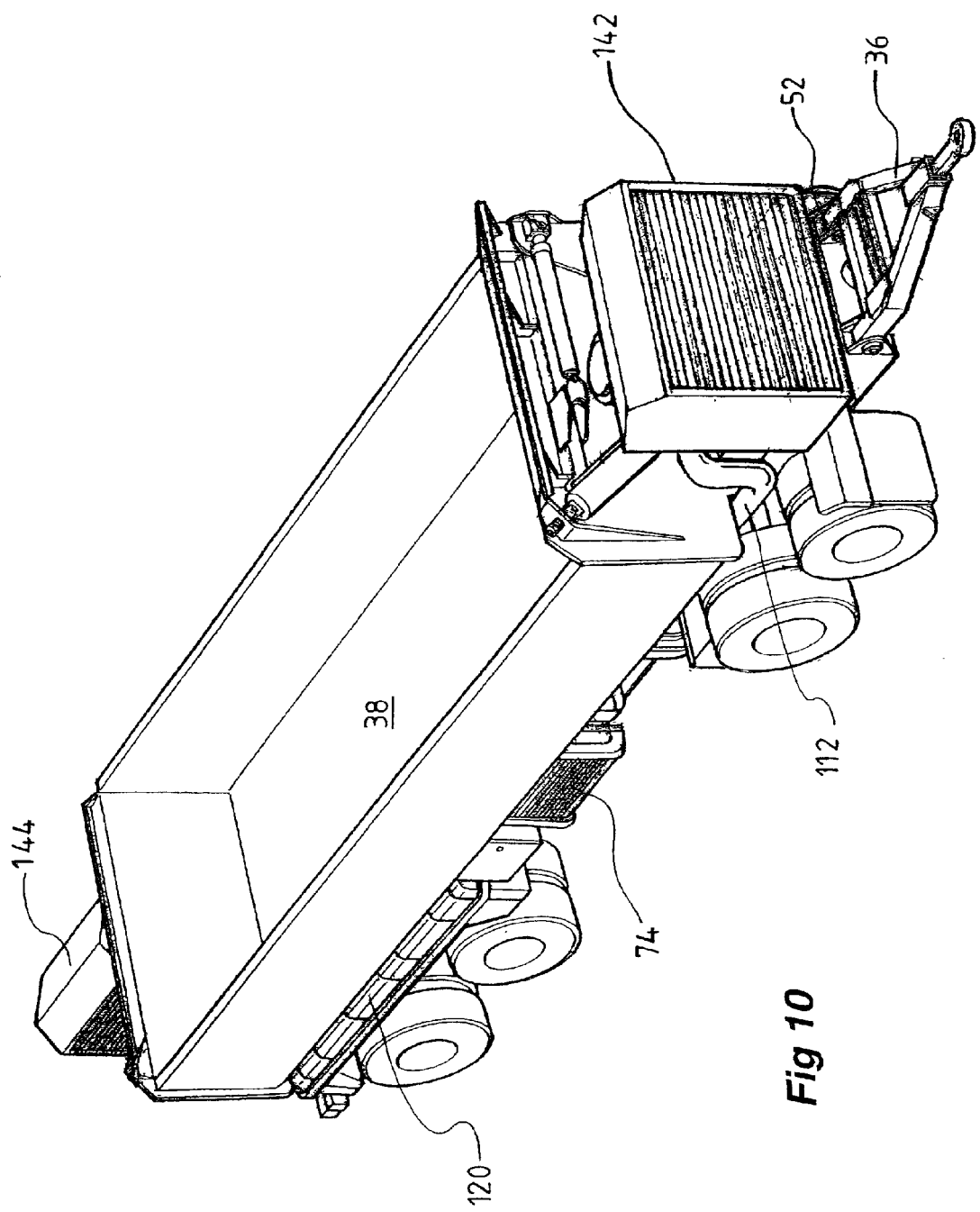
FIG. 10 is a perspective view illustrating a power trailer embodying the present invention and having cooling means located both at the front and the rear of said power trailer.

If the power trailer carries a significant load, it may even be desirable to have two cooling systems. Such an embodiment is illustrated in FIG. 10, wherein the power trailer includes a front radiator 142 and a rear radiator 144. The front radiator 142 is mounted to lie perpendicularly across the frame 52, whilst the rear one is mounted longitudinally along the chassis. Other constructional details of each of the radiators are the same as described above. It is important to note that the orientation of the radiators may change depending on the actual requirements of the power trailer. For example, if the power trailer is intended to be used in an underground mine, where the speed of the power trailer is relatively low; it is not especially critical what orientation the radiator is at, since an air fan provides the airflow through the coils. On the other hand, if the power trailer is to be used on long-distance relatively fast runs on aboveground roads, then natural air flow may be sufficient to provide enough cooling without requiring the use of an air fan. That would require the radiator to be fully exposed to the airflow, so it needs to be mounted across the frame. An air scoop, although not illustrated, may be used to assist in the airflow.

Figure 11:
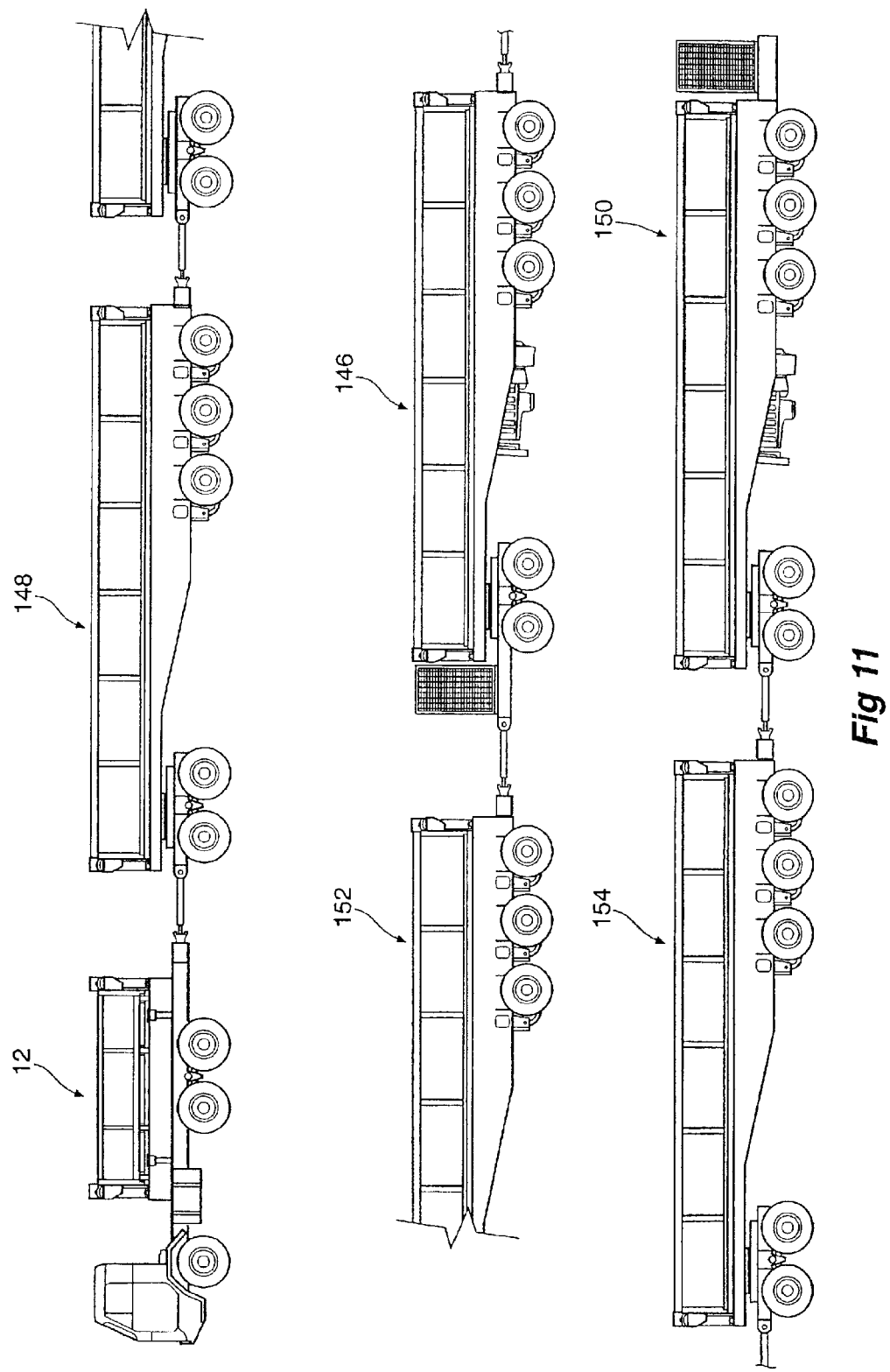
FIG. 11 is a side elevation drawing of a multi-combination vehicle incorporating several power trailers according to an embodiment of the present invention.

A plurality of different power trailer designs may be used in a single road train as illustrated in FIG. 11. A power trailer 146 having a forwardly mounted radiator system may be coupled behind prime mover 12 and ordinary trailer 148 and 152 and tow an ordinary trailer 154 that is coupled to a power trailer 150. The length of such a road train will depend on the road conditions as well as local road rules. If however, the power trailer is used on private roads, there is no reason why such as road train would not be able to operate with a plurality of power trailers and trailers.

The control of the engine 68 of a power trailer may be achieved by several different means. Much depends on the configuration of the transmission system of the prime mover, the transmission system of the power trailer usually being an automatic one. Thus there are several options as to how the power trailer may be controlled.

The first option is to have a synchronization control that synchronizes the power output of the power trailer to the prime mover. This is most appropriate when both the prime mover and the power trailer have automatic transmissions. The horsepower of an engine is calculated as the torque multiplied by the revolutions per minute (rpm) divided by a constant. Torque is simply a function of the total fuel that the system is provided with. It is therefore possible to synchronize the engines by the torque of the power trailer engine following the torque produced by the primary engine.

Engine on-board computer management systems, which allow one to measure the torque of an engine, are well known. Typically one measures the amount of fuel injected into the engine and monitors the rpm. There are known data tables from which one can then calculate the torque based upon the amount of fuel and the rpm. Each engine is unique in that one engine may have a torque graph that is different from the other but once the torque graph is known for an engine it is possible to calculate within a few percentage points of error what the torque is that the engine is producing. Engine management systems have been typically used to improve engine efficiency by knowing how to work the engine so as to conserve fuel. For example one may want to run the engine at low rpm so as to have gentle acceleration. The engine management system also provides a memory so that one may store information as to the running of the engine over a set period of time such as the last couple of hundred hours.

These engine management systems may be used to assist in controlling a road-train having a prime mover and at least one power trailer. The horsepower of the prime mover engine may be selected based upon the load that the primary mover is expected to carry. It is easy to calculate the power per weight ratio of the primary mover. The total horsepower of the power trailer engine is then selected based upon the total load so that the power-to-weight ratio of the power trailer is never greater, and usually less, than that of the prime mover. This ensures that under full throttle, the power trailer does not exert a significant pushing force on the prime mover that may affect its control and stability. Typical engine sizes for the prime mover may be around 600 horsepower whilst those of the power trailer some 400 horsepower. These engines, although different, utilize the same computer software which allows them to communicate. These commands are in the form of percentages of torque, and are sent to the secondary power trailer engine through a data link.

The power trailer typically has a hard-wired control circuit running from a control panel mounted in the truck cab. This control panel gives the driver the necessary feedback from the power unit in the form of engine revolutions, oil pressure, coolant temperatures and other engine self-diagnostic features. The control panel houses the transmission gear selector and diagnostic display. The driver has the ability to shut the unit down at any time.

Those skilled in the art will also appreciate that engine management systems have the capability to control the total torque produced by an engine so that even if an engine is capable of a certain horsepower, the engine management system can ensure that the actual horsepower produced is less. That is, an engine may be de-torqued.

Accordingly, under normal operating conditions and wherein both the prime mover and the power trailer use automatic transmissions having some five to ten gears, the torque produced by the primary engine is measured and the data used to control the torque produced by the secondary engine.

In ideal systems there are automatic transmissions both in the first truck and the trailer. These are good systems when one is dealing with, for example, automatic transmissions that may have 5 or 10 speeds.

However, engine management systems increase operational complexity and further require communication between the two engines. An alternative control means is to directly control the torque of each engine by controlling the amount of fuel injected by use of the accelerator pedal. It is known to use an accelerator pedal that is rotatably connected to an electronic element such as a potentiometer. Such a potentiometer may be calibrated so that the amount of depression of the accelerator pedal equates to a percentage of either the torque or rpm of the engine. The present invention provides for an accelerator pedal that controls two potentiometers.

Figure 12:
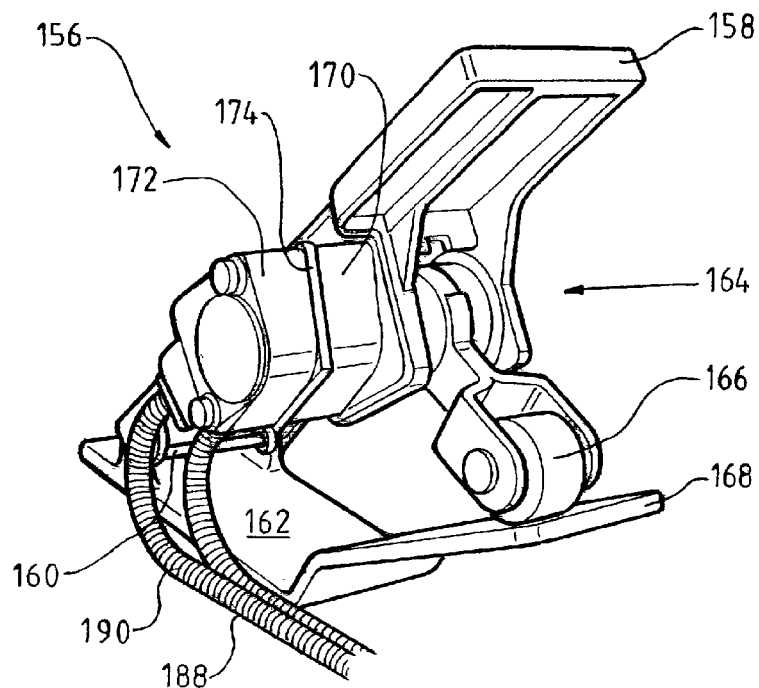
FIG. 12 is a schematic perspective view illustrating an accelerator pedal control controlling two engines.
Figure 13:
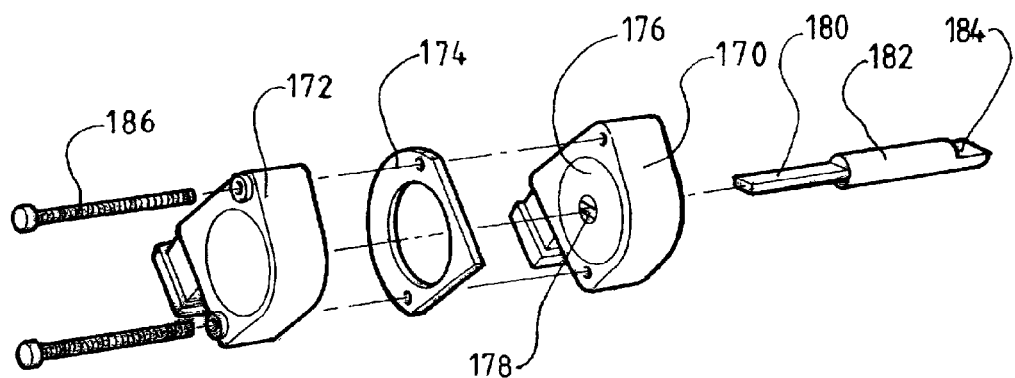
FIG. 13 is a partial exploded view of the internal configuration of the pedal control of FIG. 11.

Illustrated in FIGS. 12 and 13 is a view of such an accelerator pedal arrangement 156 including a pedal 158 pivoted at 160 on a base 162. A biasing means 164 having a rotatable wheel 166 is pivotably attached to the pedal and rotates along arm 168 so as to provide resilience for the pedal in operation. Attached to the side of the pedal is a first housing 170 and a second housing 172 separated by a spacer 174. Each housing includes a potentiometer 176 having a slot 178 that is engaged by a correspondingly shaped end 180 of shaft 182 so that as the shaft is rotated the potentiometer also rotates. The other end of shaft 182 includes a projection 184 so shaped to fixedly engage the accelerator pedal so that as the accelerator pedal is depressed, the shaft is caused to rotate thereby rotating the potentiometer. Screws 186 couple the potentiometers together.

Extending from the first potentiometer is cable 188 connected to the first engine, and extending from the second potentiometer is cable 190 connected to the secondary or power trailer engine. The potentiometers may be calibrated so that they work in unison and synchronize the torques of each engine. The driver operates the accelerator pedal as normal, which controls both engines independently, but in synchronization with each other.

A difficulty in using either the synchronization means or a dual potentiometer accelerator pedal arises when the prime mover utilizes a manual transmission system. Currently some 95% of prime movers used on roads use a manual transmission system. It is therefore necessary to provide for the control of a power trailer having an automatic transmission and that can be used when coupled to a prime mover having a manual transmission.

If a torque controller is used, when the prime mover driver is upshifting he naturally reduces the throttle or "takes his foot off the pedal". At that instant, the torque produced by the prime mover or primary engine is decreased and the synchronization means would then decrease the torque produced by the secondary engine on the power trailer. But the secondary engine's automatic transmission would then downshift in contrast to the primary engine where the reason for reducing the throttle would be to up shift. When the driver has finally upshifted a gear on the prime mover the power trailer engine will then try and also upshift a gear. This oscillating of the power trailer transmission unnecessarily loads it and is clearly undesirable.

The primary engine generally has up to 18 gears as compared to the secondary automatic transmission engine that may have up to 10 gears. Those skilled in the art would therefore immediately appreciate that synchronization of engine torques when the engines have different transmission systems is not appropriate.

Figure 14:
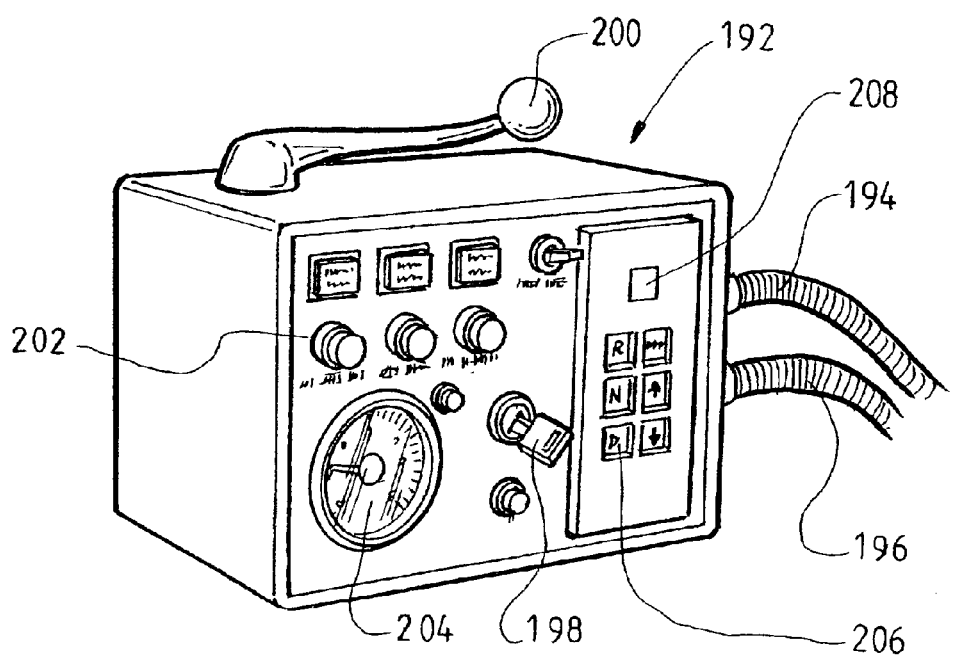
FIG. 14 is a perspective view of a typical control panel used to control the power trailer engine.

As illustrated in FIG. 14, when an automatic transmission power trailer is used with a prime mover having a manual transmission, a secondary control panel 192 is provided to the driver of the prime mover by which the driver independently controls the engine on the power trailer. Such a mechanism would communicate with the power trailer engine via cables 194 and 196.

The driver of such a road-train would have a specific operating procedure that would instruct them how a manual throttle controlled power trailer was to be operated. For a typical fully loaded road-train the control may be as follows:

1. The trailer ignition key 198 on the control panel in the truck cab is turned on, and the hand throttle 200 must be in the idle position, hard forward. The engine may or may not be started from the cab.

2. If the engine is not to be started from the cab the operator must walk back and make a visual check of the power trailer. The engine can then only be started from the control compartment 116 on the trailer. An operating key is turned on to engage the drive in the differential system.

3. After the engine is started, the driver observes diagnostic gauges such as oil and air pressure, coolant and oil temperatures located in compartments 116 or 117. The driver carries out a visual check of the power trailer. He then returns to the cab and observes the trailer control panel for various warning lamps 202 and ensures that the revolutions counter 204 indicates that the engine is idling at the appropriate revolutions (typically 700 rpm). The truck or prime mover engine is then started as per normal operating procedures.

4. To engage the trailer in drive mode, the driver applies brakes either by foot pedal or hand control, and selects the drive button "D" 206 on the control panel that places the trailer transmission into drive mode. An indication number will appear in the LED display 208. The driver then selects low gear in the truck transmission and just prior to engaging the clutch, brings the trailer engine up to approximately 1000 rpm with hand throttle 200 and drives off as normal, upshifting through the gears. When the truck transmission is in a higher gear, such as 3rd gear, the driver brings the trailer engine up to full throttle. This places the trailer into full power mode and assists the truck to keep momentum as the truck engine is backed off for each manual gear change.

5. The driver must be aware of the extra control panel that displays warning lamps 202 and rev. Counter 204 similar to those normally found in the truck cab. The truck and trailer rev. counters give the driver an indication how the power trailer is performing. The trailer engine will be revving higher in most cases than the truck engine by some 200 to 300 rpm. This depends on the gears selected in the truck and trailer.

6. The trailer engine can be shut down at any time from the key 198 on the cab control panel, if an emergency arises on the road.

7. After a load has been delivered the power trailer engine may be turned off when returning to collect a new load.

Fail-safe mechanisms may be introduced so that if for whatever reason the primary engine stopped running, then the secondary engine would also turn off or at least its transmission would decouple to prevent the power trailer from pushing the road-train and the driver losing control. An override control may be provided in circumstances where the power trailer is coupled directly behind the prime mover and where the control of the road-train is still possible. Under these conditions the secondary engine of the power trailer will enable the road-train to be driven to a suitable repair facility. This in itself is an advantage of using a power trailer in a road-train.

One can therefore appreciate that the present invention provides for a road-train that is capable of hauling heavier loads, especially in underground mines, with the use of a power trailer(s). The power trailer includes a cooling means separated from the engine and of a size and in a position to provide additional cooling. The use of such power trailers has great advantages for a number of reasons.

Firstly in shaft mines, a vertical shaft is used to bring mine ore out of the mine to the surface, whereas trucks are typically used in decline mines to haul out the mined ore. Additionally, in shaft mines, trucks typically operate on a given level within the mine and may spend a significant portion of the total utilization time of the truck idling or waiting, for instance time spent being loaded and unloaded. In contrast, trucks used in decline mines typically spend a significantly higher time actually operating as trucks, particularly in very deep mines having very long exit inclines requiring significant travel time. In view of the foregoing, the power-to-weight ratio is a more important consideration in decline mines, and therefore the use of multicombination vehicles with power trailers results in a greater advantage in decline mines, particularly those that are very deep. Without the additional cooling means the trucks would overheat and would not be able to travel up an incline for a significant period of time.

There are also issues of ventilation. Hauling a ton of ore out of a decline mine takes a given amount of energy per ton per kilometer. It is noted that the average engine efficiency of conventional engines is approximately 34%, which results in a lot of wasted energy in the form of hot air exhausted into the mine. Conventional trucks have a poor power-to-weight ratio, as compared to the power-to-weight ratio of a power trailer according to the present invention. Existing trucks therefore result in more hot air being exhausted into the mine per ton of hauled ore and therefore require more relatively cold ventilation air to be pumped into the mine via a ventilation shaft. It is noted that drilling a ventilation shaft is a major cost in an underground mine.

The present invention also assists in road maintenance in underground mines as well as the road wear on aboveground roads. The use of a road-train having a power trailer may permit increased use of blacktop roads in underground mines due to the reduced weight-per-axle loading. Standard articulated trucks may have a loading greater than 33 tons/axle, whereas a road-train may have a loading of about 10 tons/axle. Because of the heavier loading on articulated dump trucks, they are prone to tearing up blacktop roads, which may preclude their use. In lieu of the blacktop roads, clay and gravel roads are used which must be graded and treated with water for safety purposes, to keep down the dust from the road. Accordingly use of a power trailer can permit the use of blacktop roads, and therefore reduce the cost of road maintenance.

Another reason why the power trailer is important in underground mines is that it provides additional traction since more axles are driven.

The use of a power trailer in a road-train also increases the effective depth of a mine and thus increased the value of a particular mine. Typically if it is known that an ore extends to, for example, a certain depth such as 1000 meters, the mine operators will typically use a vertical shaft to haul out the ore since this method is relatively inexpensive. However, in some instances the operators may mine progressively deeper levels within the mine and extract the ore using trucks. If this approach is used initially, by the time the operators become aware of the ultimate depth of the ore, a significant amount of ore may have been mined and therefore the operators may no longer be able to justify the cost of drilling a vertical shaft to extract the ore. By providing a more efficient trucking system by using a power trailer having a superior cooling means, the operator can continue to operate the mine at a deeper level, therefore effectively increasing the depth of the ore available to the mine operator thereby increasing the value of the project. Current typical limits of mine depth are some 600 meters.

Thus one can see that the present invention teaches a multi-combination vehicle consisting of a powered prime mover, at least one powered trailer and which may include a number of non-powered trailers. The power trailer(s) are controlled either by a synchronization system, a dual-pot accelerator pedal or a manual control in the truck cab. The choice depends on whether the transmission system of the truck is a manual or an automatic one. If the truck transmission is automatic then one can use torque synchronizing either by an engine management system or by using a common accelerator pedal. By ensuring that the operation of the engines on the prime mover and the powered trailer are synchronized, the problems of take-off of a fully loaded vehicle are reduced, as is the potential damage to transmissions and differentials. If the truck transmission is manual then it is preferable to use a manual throttle control for the power trailer.

Whilst the foregoing description has set forth the preferred embodiments of the present invention in some detail, it is to be understood that numerous modifications, obvious to a person skilled in the art, may be made without departing from the scope of the invention as defined by the ensuing claims. It is therefore to be understood that the invention is not limited to the specific embodiments as herein described.

What is claimed is:

1. A multi-combination vehicle for use in transporting a product over roadways, said vehicle comprising:
    a powered towing unit having a chassis, a forward, wheeled steering axle suspended from said chassis and a rear axle assembly having at least one wheeled axle and suspended from said chassis by a rear suspension system, said wheeled axles supporting the powered unit for movement over the roadways, wherein at least one of said wheeled axles comprises a driving axle, said powered towing unit further including a first source of motive power mounted on said chassis and means for transmitting torque from said first source of motive power to said driving axle; and
    a power trailer mechanically coupled to said powered towing unit and having a front end and a rear end, said trailer including a chassis, an unpowered dolly coupled to and supporting the front end of said trailer chassis, and at least one wheeled, driven axle supporting the rear end of the power trailer for movement over the roadways, said at least one wheeled, driven axle being suspended from the rear end of said chassis of said power trailer, said power trailer including a second source of motive power mounted below said trailer chassis and means for transmitting torque from said second source of motive power to said at least one wheeled driven axle,
    said powered trailer further including a cooling means mounted on said trailer-chassis remote from said second source of motive power, said cooling means being in fluid communication with said second source of motive power,
    said powered towing unit further including first engine control means located in a cab of said unit,
    said power trailer further including second engine control means located in said powered towing unit cab,
    said first and second control means comprising a dual-potentiometer accelerator pedal.
2. A multicombination vehicle as in claim 1 wherein said cooling means is located at the rear of said power trailer.
3. The multi-combination vehicle of claim 1, wherein said cooling means is mounted on said trailer chassis proximate the rear of said power trailer.
4. A multicombination vehicle as in claim 1 wherein said cooling means is located at the side of said power trailer.
5. The multi-combination vehicle of claim 1, wherein the torques of said first source of motive power and said second source of motive power are synchronized so that when said torque of said first source of motive power is increased so is proportionally said torque of said second source of motive power.
6. The multi-combination vehicle of claim 1, wherein said power trailer includes a load-carrying body mounted and disposed above said chassis.
7. The multi-combination vehicle of claim 1, wherein said powered towing unit comprises a rigid body truck, said first source of motive power comprises an internal combustion engine, and said powered towing unit means for transferring torque includes a transmission.
8. The multi-combination vehicle of claim 1, wherein said second source of motive power comprises an internal combustion engine and said power trailer means for transferring torque includes a transmission.
9. The multi-combination vehicle of claim 1, wherein said second control means comprises a manual hand throttle located in the powered towing unit.
10. The multi-combination vehicle of claim 1, wherein located between the powered towing unit and the power trailer is a first trailer, said power trailer being mechanically coupled to said first trailer.
11. A multi-combination vehicle, comprising:
    a prime mover including a first engine located on said prime mover;
    a trailer mechanically coupled to said prime mover and including a second engine located on said trailer, said trailer also including a chassis having a front end and a rear end, and an unpowered dolly supporting the front end, said trailer further including a cooling means; and
    control means adapted to operatively couple said first and second engines, said control means comprising a calibrated dual-potentiometer accelerator pedal adapted to control the torque output of said first and second engines.
12. A multi-combination vehicle for use in transporting a product over roadways, said multi-combination vehicle comprising:
    a powered towing unit having a first chassis, a forward wheeled steering axle suspended from said first chassis and a rear axle assembly having at least one wheeled axle and suspended from said first chassis by a rear suspension system, said wheeled axles supporting the powered unit for movement over the roadways, wherein at least one of said wheeled axles comprises a driving axle, said powered towing unit further including a first source of motive power mounted on said chassis and means for transmitting torque from said first source of motive power to said driving axle; and
    a power trailer mechanically coupled to said powered towing unit and including a second chassis, having opposite, longitudinally spaced apart front and rear ends, a load-carrying body mounted on and disposed above said second chassis, and at least one wheeled, driven axle supporting said power trailer for movement over the roadways, said at least one wheeled, driven axle being suspended from said second chassis, said power trailer further including an internal combustion engine mounted on said second chassis at a position longitudinally intermediate said ends of said second chassis, and means for transmitting torque from said internal combustion engine to said at least one wheeled, driven axle, said power trailer including at least one radiator in communication with said internal combustion engine and disposed longitudinally on top of said second chassis proximate said rear end of said second chassis, said radiator being disposed at a position remote from said internal combustion engine.

13. The multicombination vehicle as recited in claim 12, wherein said at least one radiator is a disposed longitudinally proximate a front one of said ends of said second chassis.

14. The multicombination vehicle as recited in claim 12, wherein said at least one radiator comprises a pair of radiators, one of said pair of radiators being disposed longitudinally proximate a front one of said ends of said second chassis and the other of said pair of radiators being disposed longitudinally proximate a rear one of said ends of said second chassis.

15. The multicombination vehicle as recited in claim 14, wherein said at least one radiator is oriented so that is lies transversely across the second chassis.

16. The multi-combination vehicle of claim 12, wherein said radiator includes a fan and a plurality of coils, said fan and said plurality of coils being disposed in serial flow relationship with one another.

17. The multicombination vehicle as recited in claim 15, wherein said at least one radiator includes a plurality of coils and said power trailer further includes an air scoop, said air scoop being effective for directing air through said plurality of coils of said at least one radiator during operation of said multicombination vehicle.

* * * * *